(12) United States Patent
Song et al.

(10) Patent No.: US 11,272,487 B2
(45) Date of Patent: Mar. 8, 2022

(54) METHOD AND APPARATUS FOR CONFIGURING A TRIGGERING CONDITION OF A BEAM FAILURE EVENT AND A COMMUNICATION SYSTEM

(71) Applicant: FUJITSU LIMITED, Kawasaki (JP)

(72) Inventors: Lei Song, Beijing (CN); Xin Wang, Beijing (CN)

(73) Assignee: FUJITSU LIMITED, Kawasaki (JP)

( * ) Notice: Subject to any disclaimer, the term of this patent is extended or adjusted under 35 U.S.C. 154(b) by 75 days.

(21) Appl. No.: 16/729,913

(22) Filed: Dec. 30, 2019

(65) Prior Publication Data

US 2020/0137750 A1    Apr. 30, 2020

Related U.S. Application Data

(63) Continuation of application No. PCT/CN2017/097174, filed on Aug. 11, 2017.

(51) Int. Cl.
*H04W 72/04* (2009.01)
*H04B 1/74* (2006.01)
*H04W 72/08* (2009.01)

(52) U.S. Cl.
CPC .......... *H04W 72/0413* (2013.01); *H04B 1/74* (2013.01); *H04W 72/042* (2013.01); *H04W 72/046* (2013.01); *H04W 72/085* (2013.01)

(58) Field of Classification Search
CPC ........... H04W 72/0413; H04W 72/042; H04W 72/046; H04W 72/085; H04B 1/74;
(Continued)

(56) References Cited

U.S. PATENT DOCUMENTS 10,374,679 B2 *  8/2019  John Wilson ........ H04B 7/0695
10,555,359 B2 *  2/2020  Xia .................... H04B 7/088
(Continued)

FOREIGN PATENT DOCUMENTS

CN     104885377 A    9/2015
WO     2017/024516 A1  2/2017

OTHER PUBLICATIONS

Extended European search report with supplementary European search report and the European search opinion issued by the European Patent office for corresponding European Patent Application No. 17920832.7-1220, dated Jan. 18, 2021.
(Continued)

*Primary Examiner* — Brian T O Connor
(74) *Attorney, Agent, or Firm* — Myers Wolin, LLC

(57) ABSTRACT

Method and apparatus for configuring a triggering condition of a beam failure event and a communication system. The method includes: a network device configures a UE with one or more control channel monitoring groups, so that when the UE detects that all beams to which a monitoring group corresponds fail in transmission, the UE reports beam failure event of the monitoring group fails in transmission; wherein, each monitoring group corresponds to one or more pieces of downlink control information (DCI). By configuring regarding the triggering conditions of the beam failure events, detection and report of beam failure in more complex scenarios may be supported, such as a scenario where one piece of DCI is transmitted in multiple control resource sets, and a scenario where multiple pieces of DCI are transmitted in one control resource set, etc.

8 Claims, 4 Drawing Sheets

(58) Field of Classification Search
CPC .... H04B 7/0617; H04B 7/088; H04B 7/0695; H04L 5/0053; H04L 5/0023
See application file for complete search history.

(56) References Cited

U.S. PATENT DOCUMENTS

| | | | | |
|---|---|---|---|---|
| 10,602,520 | B2* | 3/2020 | John Wilson | H04B 7/0617 |
| 2017/0311301 | A1 | 10/2017 | Yu et al. | |
| 2017/0331577 | A1* | 11/2017 | Parkvall | H04W 4/00 |
| 2017/0331670 | A1* | 11/2017 | Parkvall | H04J 11/0079 |
| 2018/0227102 | A1* | 8/2018 | John Wilson | H04B 7/0408 |
| 2018/0279287 | A1* | 9/2018 | John Wilson | H04B 7/088 |
| 2019/0053293 | A1* | 2/2019 | Akoum | H04W 76/19 |
| 2019/0053312 | A1* | 2/2019 | Xia | H04W 72/046 |
| 2019/0341990 | A1* | 11/2019 | John Wilson | H04B 7/0632 |
| 2020/0059398 | A1* | 2/2020 | Pan | H04W 72/0413 |
| 2020/0099437 | A1* | 3/2020 | Harada | H04W 76/19 |
| 2020/0119839 | A1* | 4/2020 | Jo | H04B 7/06 |
| 2020/0137750 | A1* | 4/2020 | Song | H04L 5/0023 |
| 2020/0177265 | A1* | 6/2020 | Guan | H04W 72/0453 |
| 2021/0014791 | A1* | 1/2021 | Freda | H04W 52/0216 |

OTHER PUBLICATIONS

Ramachandra et al., "On Automatic Establishment of Relations in 5G Radio Networks", 2016 IEEE 27th Annual International Symposium on Personal, Indoor, and Mobile Radio Communications (PIMRC): Workshop: 6th International Workshop on Self-Organizing Networks (IWSON), Sep. 4, 2016.
Nokia et al., "Beam Recovery", Agenda Item: 5.1.2.2.2, 3GPP TSG-RAN WG1 NR Ad-Hoc#2, R1-1711291, Qingdao, P.R. China, Jun. 27-30, 2017.
International Search Report and Written Opinion of the International Searching Authority issued by the State Intellectual Property Office of the P.R. China for corresponding International Patent Application No. PCT/CN2017/097174, dated May 7, 2018, with an English translation.
Fujitsu, "Discussion on beam failure recovery procedure", Agenda Item: 5.1.2.2.2, 3GPP TSG RAN WG1 NR Ad-Hoc#2, R1-1710236, Qingdao, P.R. China, Jun. 27-30, 2017.
Samsung, "Multibeam Transmission for PDCCH", Agenda Item: 5.1.3.1.2.3, 3GPP TSG RAN WG1 NR Ad-Hoc#2, R1-1710695, Qingdao, P.R. China, Jun. 27-30, 2017.
Notice of Reasons for Refusal issued by the Japan Patent Office for corresponding Japanese Patent Application No. 2019-571432, dated Feb. 9, 2021, with an English translation.
CMCC, "Discussion on UE triggered beam reporting for beam recovery", Agenda item: 8.1.2.2.3, 3GPP TSG-RAN WG1 Meeting #88, R1-1703404, Athens, Greece, Feb. 13-17, 2017.

* cited by examiner

Figure 1

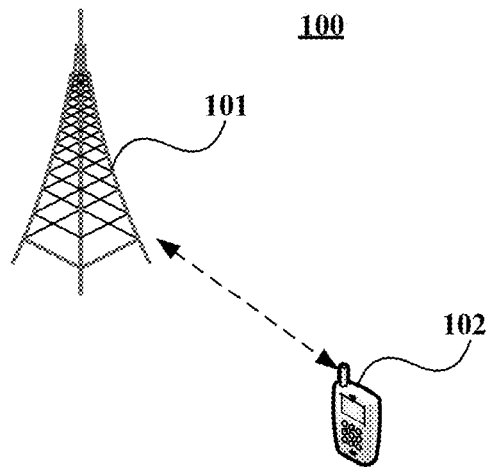

Figure 2

201 a network device configures a UE with one or more control channel monitoring groups, so that when the UE detects that all beams to which a monitoring group corresponds fail in transmission, the UE reports beam failure event of the monitoring group fails in transmission

Figure 3

301 a network device configures a UE with triggering conditions of one or more beam failure events, so that when the triggering conditions are satisfied, the UE reports beam failure events

METHOD AND APPARATUS FOR CONFIGURING A TRIGGERING CONDITION OF A BEAM FAILURE EVENT AND A COMMUNICATION SYSTEM

CROSS REFERENCE TO RELATED APPLICATIONS

This application is a continuation application of International Application No. PCT/CN2017/097174, filed on Aug. 11, 2017, the contents of which are incorporated herein by reference.

FIELD

This disclosure relates to the field of communications, and in particular to a method and apparatus for configuring a triggering condition of a beam failure event and a communication system.

BACKGROUND

Massive multiple-input multiple-output (MIMO) technology is a key technology in a new radio (NR) system, which includes studies of the frequency bands below 6 GHz and above 6 GHz. With the increase of the frequency bands, the fading and loss produced in the transmission will increase accordingly, and the beamforming technique becomes a key technique in the massive MIMO as it may effectively compensate for the fading.

In the research of the massive MIMO technology, in order to improve the reliability of transmission, it is allowed to use a beamforming technique that simultaneously transmits multiple beams for a physical channel (a broadcast channel, a data channel, and a control channel, etc.). However, in the multi-beam beamforming technology, there still exist transmission failures due to transmission characteristics of high frequency bands, rotation of a mobile station (user equipment, UE), and blocking of obstacles, in which case by adjusting service beams, it is possible to solve the problem of transmission failure in a physical layer (layer 1) and a media access control (MAC) layer (layer 2), and thus, a beam recovery mechanism is introduced into NR systems, that is, in a case where the UE detects that the control channel (e.g. an NR-physical downlink control channel, NR-PDCCH) fails in transmission, transmission failure of a current link may be notified to a network device (such as a base station, e.g. a gNB) by transmitting an uplink request signal, and the network device will correspondingly select a new serving beam for the UE to recover the transmission.

It should be noted that the above description of the background is merely provided for clear and complete explanation of this disclosure and for easy understanding by those skilled in the art. And it should not be understood that the above technical solution is known to those skilled in the art as it is described in the background of this disclosure.

SUMMARY

It was found by the inventors that in order to support flexible transmission of downlink control information (DCI), for example, if one piece of DCI is transmitted in one or more control resource sets, triggering conditions need to be configured for report of beam failure events.

In order to solve the above problem, embodiments of this disclosure provide a method and apparatus for configuring a triggering condition of a beam failure event and a communication system.

According to a first aspect of the embodiments of this disclosure, there is provided a method for configuring a monitoring group, the method including:

a network device configures a UE with one or more control channel monitoring groups, so that when the UE detects that all beams to which a monitoring group corresponds fail in transmission, the UE reports beam failure events of the monitoring group fails in transmission; wherein, each monitoring group corresponds to one or more pieces of downlink control information (DCI).

According to a second aspect of the embodiments of this disclosure, there is provided a method for triggering a beam failure event, the method comprising:

a UE determines whether a trigger condition of a beam failure event is satisfied according to configuration of a network device; and the UE reports a beam failure event when the trigger condition of a beam failure event is satisfied.

According to a third aspect of the embodiments of this disclosure, there is provided a method for configuring a triggering condition of a beam failure event, the method including:

a network device configures a UE with triggering conditions of one or more beam failure events, so that when the triggering conditions are satisfied, the UE reports beam failure events.

According to a fourth aspect of the embodiments of this disclosure, there is provided an apparatus for configuring a monitoring group, the apparatus including:

a configuring unit configured to configure a UE with one or more control channel monitoring groups, so that when the UE detects that all beams to which a monitoring group corresponds fail in transmission, the UE reports beam failure event of the monitoring group fails in transmission; wherein, each monitoring group corresponds to one or more pieces of downlink control information (DCI).

According to a fifth aspect of the embodiments of this disclosure, there is provided an apparatus for triggering a beam failure event, the apparatus including:

a determining unit configured to determine whether a trigger condition of a beam failure event is satisfied according to configuration of a network device; and a reporting unit configured to report a beam failure event when the trigger condition of a beam failure event is satisfied.

According to a sixth aspect of the embodiments of this disclosure, there is provided an apparatus for configuring a triggering condition of a beam failure event, the apparatus comprising:

a configuring unit configured to configure a UE with triggering conditions of one or more beam failure events, so that when the triggering conditions are satisfied, the UE reports beam failure events.

According to a seventh aspect of the embodiments of this disclosure, there is provided a network device, including the apparatus as described in the fourth or the sixth aspect.

According to an eighth aspect of the embodiments of this disclosure, there is provided a terminal equipment, including the apparatus as described in the fifth aspect.

According to a ninth aspect of the embodiments of this disclosure, there is provided a communication system, including the network device as described in the seventh aspect and the terminal equipment as described in the eighth aspect.

An advantage of the embodiments of this disclosure exists in that by configuring the triggering conditions of the beam failure events by taking the DCI contents as units, detection and report of beam failure in more complex scenarios may be supported, such as a scenario where one piece of DCI is transmitted in multiple control resource sets, and a scenario where multiple pieces of DCI are transmitted in one control resource set, etc.

With reference to the following description and drawings, the particular embodiments of this disclosure are disclosed in detail, and the principles of this disclosure and the manners of use are indicated. It should be understood that the scope of the embodiments of this disclosure is not limited thereto. The embodiments of this disclosure contain many alternations, modifications and equivalents within the scope of the terms of the appended claims.

Features that are described and/or illustrated with respect to one embodiment may be used in the same way or in a similar way in one or more other embodiments and/or in combination with or instead of the features of the other embodiments.

It should be emphasized that the term "comprises/comprising/includes/including" when used in this specification is taken to specify the presence of stated features, integers, steps or components but does not preclude the presence or addition of one or more other features, integers, steps, components or groups thereof.

BRIEF DESCRIPTION OF THE DRAWINGS

Elements and features depicted in one drawing or embodiment of the disclosure may be combined with elements and features depicted in one or more additional drawings or embodiments. Moreover, in the drawings, like reference numerals designate corresponding parts throughout the several views and may be used to designate like or similar parts in more than one embodiment.

The drawings are included to provide further understanding of this disclosure, which constitute a part of the specification and illustrate the exemplary embodiments of this disclosure, and are used for setting forth the principles of this disclosure together with the description. It is clear and understood that the accompanying drawings in the following description are some embodiments of this disclosure, and for those of ordinary skills in the art, other accompanying drawings may be obtained according to these accompanying drawings without making an inventive effort. In the drawings:

FIG. 1 is a schematic diagram of a communication system of an embodiment of this disclosure;

FIG. 2 is a schematic diagram of the method for configuring a triggering condition of a beam failure event of Embodiment 1;

FIG. 3 is a schematic diagram of the method for configuring a triggering condition of a beam failure event of Embodiment 2;

DETAILED DESCRIPTION

Figure 4:
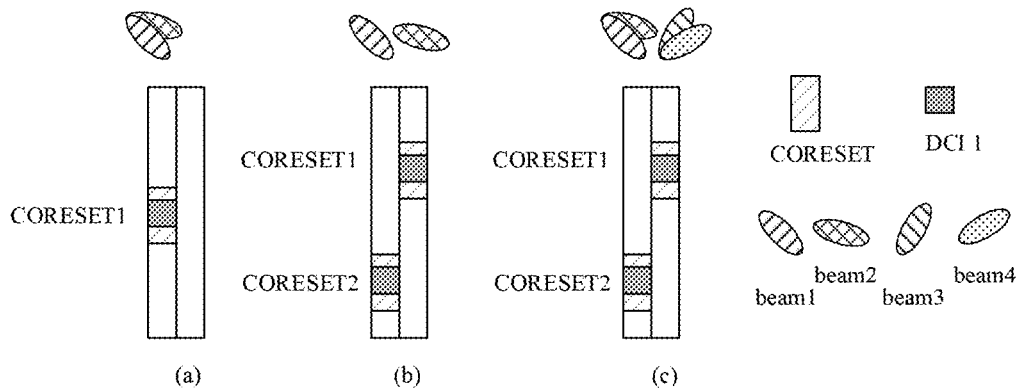
FIG. 4 is a schematic diagram of mapping of one DCI message in a CORESET.

These and further aspects and features of this disclosure will be apparent with reference to the following description and attached drawings. In the description and drawings, particular embodiments of the disclosure have been disclosed in detail as being indicative of some of the ways in which the principles of the disclosure may be employed, but it is understood that the disclosure is not limited correspondingly in scope. Rather, the disclosure includes all changes, modifications and equivalents coming within the terms of the appended claims.

In the embodiments of this disclosure, terms "first", and "second", etc., are used to differentiate different elements with respect to names, and do not indicate spatial arrangement or temporal orders of these elements, and these elements should not be limited by these terms. Terms "and/or" include any one and all combinations of one or more relevantly listed terms. Terms "contain", "include" and "have" refer to existence of stated features, elements, components, or assemblies, but do not exclude existence or addition of one or more other features, elements, components, or assemblies.

In the embodiments of this disclosure, single forms "a", and "the", etc., include plural forms, and should be understood as "a kind of" or "a type of" in a broad sense, but should not defined as a meaning of "one"; and the term "the" should be understood as including both a single form and a plural form, except specified otherwise. Furthermore, the term "according to" should be understood as "at least partially according to", the term "based on" should be understood as "at least partially based on", except specified otherwise.

In the embodiments of this disclosure, the term "communication network" or "wireless communication network" may refer to a network satisfying any one of the following communication standards: long term evolution (LTE), long term evolution-advanced (LTE-A), wideband code division multiple access (WCDMA), and high-speed packet access (HSPA), etc.

And communication between devices in a communication system may be performed according to communication protocols at any stage, which may, for example, include but not limited to the following communication protocols: 1G (generation), 2 G 2.5 G 2.75 G 3G 4G 4.5G and 5G and new radio (NR) in the future, etc., and/or other communication protocols that are currently known or will be developed in the future.

In the embodiments of this disclosure, the term "network device", for example, refers to an equipment in a communication system that accesses a terminal equipment to the communication network and provides services for the terminal equipment. The network device may include but not limited to the following equipment: a base station (BS), an access point (AP), a transmission reception point (TRP), a broadcast transmitter, a mobile management entity (MME), a gateway, a server, a radio network controller (RNC), a base station controller (BSC), etc.

The base station may include but not limited to a node B (NodeB or NB), an evolved node B (eNodeB or eNB), and a 5G base station (gNB), etc. Furthermore, it may include a remote radio head (RRH), a remote radio unit (RRU), a relay, or a low-power node (such as a femto, and a pico, etc.). The term "base station" may include some or all of its functions, and each base station may provide communication coverage for a specific geographical area. And a term "cell" may refer to a base station and/or its coverage area, which is dependent on a context of the term.

In the embodiments of this disclosure, the term "user equipment (UE)" or "terminal equipment (TE)" refers to, for example, equipment accessing to a communication network and receiving network services via a network device. The user equipment may be fixed or mobile, and may also be referred to as a mobile station (MS), a terminal, a subscriber station (SS), an access terminal (AT), or a station, etc.

The user equipment may include but not limited to the following devices: a cellular phone, a personal digital assistant (PDA), a wireless modem, a wireless communication device, a hand-held device, a machine-type communication device, a lap-top, a cordless telephone, a smart cell phone, a smart watch, and a digital camera, etc.

For another example, in a scenario of the Internet of Things (IoT), etc., the user equipment may also be a machine or a device performing monitoring or measurement. For example, it may include but not limited to a machine-type communication (MTC) terminal, a vehicle mounted communication terminal, a device to device (D2D) terminal, and a machine to machine (M2M) terminal, etc.

Scenarios in the embodiments of this disclosure shall be described below by way of examples; however, this disclosure is not limited thereto.

FIG. 1 is a schematic diagram of a communication system of an embodiment of this disclosure, in which a case where a user equipment and a network device are taken as examples is schematically shown. As shown in FIG. 1, the communication system 100 may include a network device 101 and a terminal equipment 102 (for the sake of simplicity, description is given in FIG. 1 by taking one terminal equipment only as an example).

In the embodiment of this disclosure, existing traffics or traffics that may be implemented in the future may be performed between the network device 101 and the user equipment 102.

For example, such traffics may include but not limited to an enhanced mobile broadband (eMBB), massive machine type communication (MTC), and ultra-reliable and low-latency communication (URLLC), etc.

In the current discussion of the 3rd Generation Partnership Project (3GPP), a channel state information-reference signal (CSI-RS) has been explicitly used to detect an NR-PDCCH beam failure event and identify new candidate beams and/or transceive beam pairs, the NR-PDCCH beam failure means that an RSRP XOR SINR of a CSI-RS using the same beam as the NR-PDCCH is below a certain threshold. It is defined in a current standard that one or more CSI-RS resource configurations may be configured for the UE for measurement of [RSRP XOR SINR]. The UE may assume that the CSI-RS is a CSI-RS of non-zero transmit power. Parameters configured for each CSI-RS resource via higher layer signaling include: a resource configuration, a period, an antenna port, transmit power, a pseudo-random sequence generator parameter, and a quasi-co-location (QCL) parameter, etc.

Here, if a large-scale attribute of a channel transmitting a symbol on one antenna port may be deduced from a channel transmitting a symbol on another antenna port, the two antenna ports are referred to as being of quasi co-location. The large-scale attribute herein includes one or more of delay spread, Doppler spread, Doppler shift, an average gain, and average delay. Furthermore, in some scenarios, the large-scale attribute may also include a spatial channel characteristic, i.e. beam-related information.

Furthermore, a configuration of a control resource set (CORESET) of NR-PDCCH in a current standard is: a starting position of an orthogonal frequency division multiplexing (OFDM) symbol [pdcch_StartSymbol] provided by a higher-layer parameter, the number of consecutive OFDM symbols [pdcch_NumSymbol] provided by a higher-layer parameter, a set of resource blocks [pdcch RBSet] provided by a higher-layer parameter, mapping of control channel elements (CCEs) to a resource element group (REG) [pdcch_mapping] provided by a higher-layer parameter, a size of an REG bundle [REG_bundle] in a case of interlaced mapping of CCEs to an REG and provided by a higher-layer parameter, and QCL of an antenna port [QCL_ConfigId] provided by a higher-layer parameter, etc.

Here, the configuration of the CORESET includes the ID of the QCL of the antenna port, i.e. QCL-ConfigId, which is from a QCL parameter in the CSI-RS configuration directly. Currently, there are various proposals for indication granularities of QCL of an antenna ports in a CORESET, including that:

the whole CORESET corresponds to a QCL configuration, that is, corresponding to one or a group of beams or beam pairs;

search spaces in the CORESET may respectively correspond to a QCL configuration, that is, corresponding to one or a group of beams or beam pairs;

PDCCH candidates in the CORESET may respectively correspond to a QCL configuration, that is, corresponding to one or a group of beams or beam pairs;

PDCCH candidate sets in the CORESET may respectively correspond to a QCL configuration, that is, corresponding to one or a group of beams or beam pairs; and REG bundles in the CORESET may respectively correspond to a QCL configuration, that is, corresponding to one or a group of beams or beam pairs.

However, whichever the indication granularity is used, in order to support flexible transmission of control information (DCI), such as one piece of DCI is transmitted in one or more CORSETs, triggering conditions for beam failure events need to be configured.

The method and apparatus for configuring a triggering condition of a beam failure event and system shall be described below with reference to accompanying drawings and particular embodiments.

Embodiment 1

The embodiment of this disclosure provides a method for configuring a monitoring group, applicable to a network device of a communication system, such as a gNB defined in an NR standard, or the like. FIG. 2 is a schematic diagram of the method. Referring to FIG. 2, the method includes:

step 201: a network device configures a UE with one or more control channel monitoring groups, so that when the UE detects that all beams to which a monitoring group corresponds fail in transmission, the UE reports beam failure event of the monitoring group fails in transmission.

In this embodiment, the control channel is, for example, an NR-PDCCH defined in an NR standard, and the network device configures the UE with the control channel monitoring group(s), so that the UE reports the beam failure within a range of the monitoring group(s).

In this embodiment, each monitoring group corresponds to one or more pieces of DCI, and each piece of DCI uses one or more beams. When the UE detects that all beams to which one certain monitoring group corresponds fail in transmission, the UE reports beam failure event regarding this monitoring group fail in transmission, such as transmitting a beam failure recovery request to the network device, so that the network device re-allocates beams for it.

In this embodiment, one piece of DCI refers to one piece of downlink control information in the transmission; for example, it may correspond to a DCI format. From a viewpoint of a physical transmission resource, one piece of DCI may also be a PDCCH candidate or a candidate set.

In one implementation of this embodiment, each monitoring group includes IDs of all quasi-co-locations to which one or more pieces of DCI correspond, i.e. the QCL-ConfigId in the above CORESET configuration. As the ID of QCL indicates the beams, when the UE detects that all beams used by DCI to which IDs of all QCLs contained in one certain monitoring group correspond fail in transmission, the UE reports beam failure event regarding this monitoring group. In this implementation, for a case where the same monitoring group contains IDs of all QCLs to which multiple pieces of DCI correspond, the multiple pieces of DCI use identical beams. That is, this implementation is applicable to a case where quasi-co-location ID configurations of multiple pieces of DCI to which the same monitoring group corresponds are identical, i.e. a case where multiple pieces of DCI to which the same monitoring group corresponds use identical beams.

In another implementation of this embodiment, each monitoring group includes an ID of a physical resource to which one piece of DCI corresponds, such as an ID of the control resource set, an ID of a search space, and/or an ID of a set of control channel candidates, etc. For example, an indication granularity of a QCL of an antenna port in a CORESET is a PDCCH candidate set, and when one piece of DCI is transmitted on multiple CORESETs, the ID of the physical resource may include IDs of all CORESETs where the DCI is located and IDs of corresponding PDCCH candidate sets.

As the ID of the physical resource corresponds to the DCI, when the UE detects that beams used by the DCI to which the ID of the physical resource included in one certain monitoring group corresponds fail in transmission, the UE reports beam failure event regarding this monitoring group.

With the method of this embodiment, in addition to the configuration of the CORESET, the network device further configures, for the UE, a control channel monitoring group for triggering the UE to report a beam failure event, and when the UE detects that all the beams to which the monitoring group corresponds fail in transmission, the UE reports the beam failure event, which solves a problem of detecting and reporting of beam failure in a scenario where one piece of DCI is transmitted in multiple CORESETs or one CORESET transmits multiple pieces of DCI, accuracy of the detection is higher, and no more resources will be consumed.

Embodiment 2

The embodiment of this disclosure provides a method for configuring a triggering condition of a beam failure event, also applicable to a network device of a communication system, such as a gNB defined in an NR standard, or the like. FIG. 3 is a schematic diagram of the method. Referring to FIG. 3, the method includes:

step 301: a network device configures a UE with triggering conditions of one or more beam failure events, so that when the triggering conditions are satisfied, the UE reports beam failure events.

In this embodiment, different from Embodiment 1 in which the network device configures the control channel monitoring group for the user equipment, in this embodiment, the network device directly configures the user equipment with the triggering conditions of the beam failure events, and the user equipment only needs to detect whether the triggering conditions are satisfied, and reports the beam failure events if the triggering conditions are satisfied.

In this embodiment, the triggering conditions may be one or more of the following that:

all beams used by all DCI contained in any control resource set fail in transmission;

all beams used by all DCI contained in all control resource sets fail in transmission; and all beams used by all DCI contained in a predefined control resource set fail in transmission.

That is, in this embodiment, the trigger conditions are configured in units of control resource sets, and when all the beams used by all DCI included in a control resource set or all control resource sets or some control resource sets fail in transmission, report of the corresponding beam failure event is performed. Furthermore, the control resource sets in the trigger conditions may also be physical resources, such as search spaces, set of control channel candidates, etc.

With the method of this embodiment, in addition to the configuration of the CORESET, the network device further configures, for the user equipment, triggering conditions used for triggering the user equipment to report beam failure events, and when the user equipment detects that the triggering conditions are satisfied, the user equipment reports the beam failure events, thus another solution for triggering report of beam failure events is provided for a scenario where one piece of DCI is transmitted in multiple CORESETs or a scenario where one or more CORESETs transmit multiple pieces of DCI.

FIG. 4 shows mapping of a single DCI message. As shown in FIG. 4, in this example, there is only one DCI message, i.e. DCI 1. The DCI 1 may be transmitted in one CORESET, as shown in (a) of FIG. 4; it may also be transmitted in multiple CORESETs, as shown in (b) and (c) of FIG. 4. And the DCI 1 may use one beam, as shown in (b) of FIG. 4; and it may also use multiple beams, as shown in (a) and (c) of FIG. 4. In FIG. 4, (a) and (c) show a case where two beams are used for each piece of DCI. However, this embodiment is not limited thereto, and the number of beams used by each piece of DCI may also be specified according to Standards.

Figure 5:
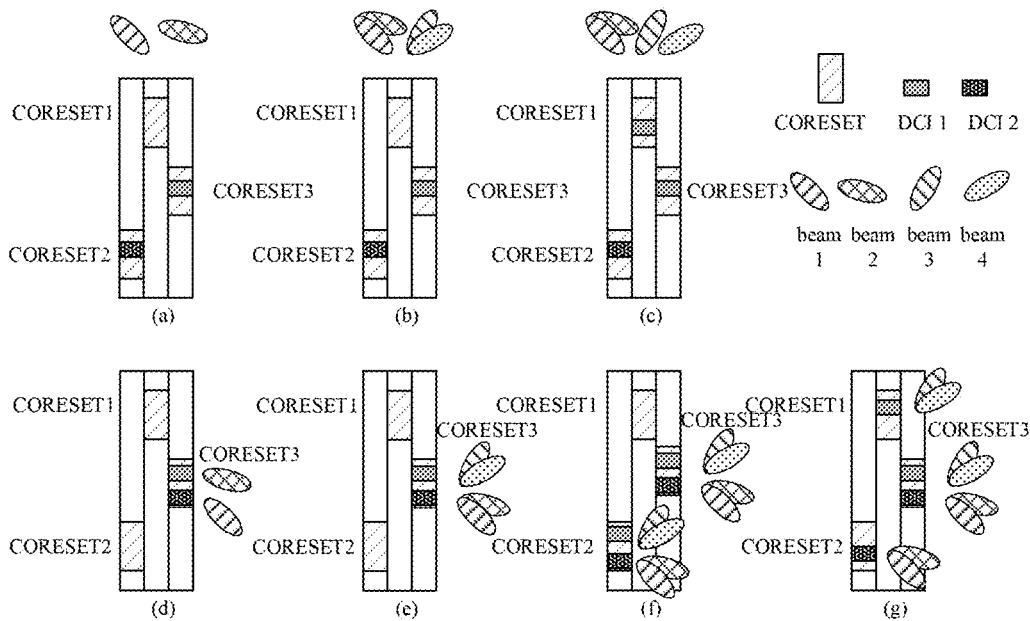
FIG. 5 is a schematic diagram of mapping of multiple DCI messages in a CORESET.

FIG. 5 shows mapping of multiple DCI messages. As shown in FIG. 5, in this example, there are two DCI messages, i.e. DCI 1 and DCI 2; wherein DCI 1 may be transmitted in one CORESET, as shown in (a), (b), (d) and (e) of FIG. 5, and may also be transmitted in multiple CORESETs, as shown in (c), (f) and (g) of FIG. 5. Likewise, DCI 2 may be transmitted in one CORESET, as shown in (a), (b), (c), (d) and (e) of FIG. 5, and may also be transmitted in multiple CORESETs, as shown in (f) and (g) of FIG. 5. Furthermore, each CORESET may transmit one piece of DCI, as shown in (a), (b) and (c) of FIG. 5, and may also transmit multiple pieces of DCI, as shown by CORESET 3 in (d), CORESET 3 in (e), CORESET 2 and CORESET 3 in (f), and CORESET 3 in (g), of FIG. 5. Moreover, DCI 1 and DCI 2 may use one beam, as shown in (a) of FIG. 5, DCI 1 of (c) of FIG. 5, and (d) of FIG. 5, and may also use multiple beams, as shown in (b) of FIG. 5, DCI 2 in (c) of FIG. 5, (e) of FIG. 5, (f) of FIG. 5, and (g) of FIG. 5. In FIG. 5, (b), DCI 2 in (c), (e), (f) and (g) show a case where each piece of DCI uses two beams. However, this embodiment is not limited thereto, and the number of beams used by each piece of DCI may also be specified according to Standards.

No matter the method for mapping DCI in FIG. 4, or the method for mapping DCI in FIG. 5, or other methods for mapping DCI evolved from the methods for mapping DCI in FIG. 4 and FIG. 5, the method in Embodiment 1 or Embodiment 2 may be used for configuring triggering conditions of beam failure events.

With the method of Embodiment 1, the control channel monitoring groups are configured for the user equipment, each control channel monitoring group containing ID(s) of QCLs corresponding to one or more pieces of DCI or a physical resource ID corresponding to one piece of DCI. Hence, the user equipment may learn a beam to which each control channel monitoring group corresponds, and when it detects that all beams to which one certain control channel monitoring group corresponds fail in transmission, it reports beam failure event regarding the control channel monitoring group.

With the method of Embodiment 2, the triggering conditions of the beam failure events are configured for the user equipment, the triggering conditions containing CORESETs for performing report of beam failure events. Hence, when the user equipment detects that all beams used by all the DCI contained in the CORESETs fail in transmission, it reports beam failure events.

In the embodiments of this disclosure, the method of Embodiment 2 and the method of Embodiment 1 may be used in combination, so long as the configurations thereof are not contradictory.

Embodiment 3

Figure 6:
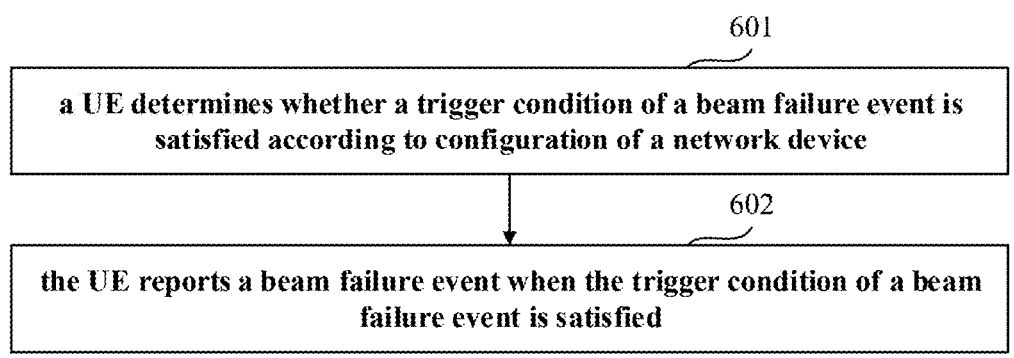
FIG. 6 is a schematic diagram of the method for triggering a beam failure event of Embodiment 3.

The embodiment of this disclosure provides a method for triggering a beam failure event, applicable to a terminal equipment of a communication system, such as a UE defined in an NR standard, or the like, which is processing at a UE side corresponding to the method in Embodiment 1 or Embodiment 2, with contents identical to those in Embodiment 1 and Embodiment 2 being not going to be described herein any further. FIG. 6 is a schematic diagram of the method. As shown in FIG. 6, the method includes:

step 601: a UE determines whether a trigger condition of a beam failure event is satisfied according to configuration of a network device; and step 601: the UE reports a beam failure event when the trigger condition of a beam failure event is satisfied.

In one implementation, the configuration of a network device is: one or more control channel monitoring groups, each monitoring group corresponding to one or more pieces of DCI, and when the UE detects that all beams to which a monitoring group correspond fail in transmission, the UE reports beam failure event of the monitoring group fails in transmission. Contents related to the control channel monitoring groups have been described in Embodiment 1, and are incorporated herein, which shall not be described herein any further.

In another implementation, the configuration of a network device is: triggering conditions of one or more beam failure events, and when the UE detects that the triggering conditions are satisfied, the UE reports beam failure events. Contents related to the triggering conditions have been described in Embodiment 2, and are incorporated herein, which shall not be described herein any further.

With the method of this embodiment, in addition to the configuration of the CORESET, the network device further configures, for the user equipment, a control channel monitoring group for triggering the user equipment to report beam failure events, or configures, for the user equipment, the triggering conditions for triggering the user equipment to report beam failure events, and when the user equipment detects that all the beams to which the monitoring group corresponds fail in transmission or detects that the triggering conditions are satisfied, the user equipment reports the beam failure events, which solves a problem of monitoring and reporting of beam failure in a scenario where one piece of DCI is transmitted in multiple CORESETs or one CORESET transmits multiple pieces of DCI, accuracy of the detection is higher, and no more resources will be consumed.

Embodiment 4

The embodiment of this disclosure provides an apparatus for configuring a monitoring group, configured in a network device. As principles of the apparatus for solving problems are similar to that of the method in Embodiment 1, reference may be made to the implementation of the method in Embodiment 1 for implementation of the apparatus, with identical contents being not going to be described herein any further.

Figure 7:
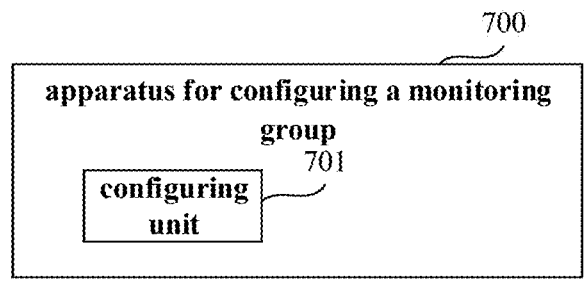
FIG. 7 is a schematic diagram of the apparatus for configuring a triggering condition of a beam failure event of Embodiment 4.

FIG. 7 is a schematic diagram of the apparatus for configuring a monitoring group of this embodiment. As shown in FIG. 7, the apparatus 700 includes: a configuring unit 701 configured to configure a UE with one or more control channel monitoring groups, so that when the UE detects that all beams to which a monitoring group corresponds fail in transmission, the UE reports beam failure event of the monitoring group fails in transmission; wherein, each monitoring group corresponds to one or more pieces of DCI.

In this embodiment, one piece of DCI corresponds to one DCI format, or one piece of DCI corresponds to a control channel candidate, or one piece of DCI corresponds to a set of control channel candidates.

In one implementation, each monitoring group includes IDs of all quasi-co-locations to which one or more pieces of DCI correspond, configuration of the IDs of the quasi-co-locations of the multiple pieces of DCI being identical.

In another implementation, each monitoring group includes an ID of a physical resource to which one piece of DCI corresponds. The ID of a physical resource here may include, for example, an ID of the control resource set, an ID of a search space, and/or an ID of a set of control channel candidates, etc.

With the apparatus of this embodiment, in addition to the configuration of the CORESET, the network device further configures, for the user equipment, a control channel monitoring group for triggering the user equipment to report beam failure events, and when the user equipment detects that all the beams to which the monitoring group corresponds fail in transmission, the user equipment reports the beam failure event, which solves a problem of monitoring and reporting of beam failure in a scenario where one piece of DCI is transmitted in multiple CORESETs or one CORESET transmits multiple pieces of DCI, accuracy of the detection is higher, and no more resources will be consumed.

Embodiment 5

The embodiment of this disclosure provides an apparatus for configuring a triggering condition of a beam failure event, configured in a network device. As principles of the apparatus for solving problems are similar to that of the method in Embodiment 2, reference may be made to the implementation of the method in Embodiment 2 for implementation of the apparatus, with identical contents being not going to be described herein any further.

Figure 8:
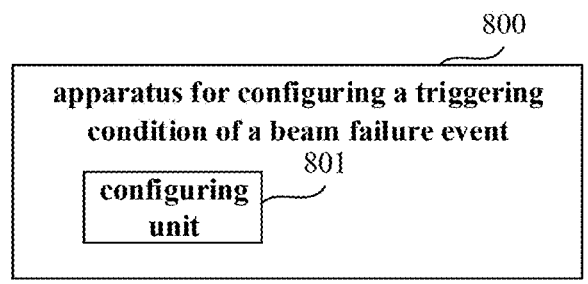
FIG. 8 is a schematic diagram of the apparatus for configuring a triggering condition of a beam failure event of Embodiment 5.

FIG. 8 is a schematic diagram of the apparatus for configuring a triggering condition of a beam failure event of this embodiment. As shown in FIG. 8, the apparatus 800 includes: a configuring unit 801 configured to configure a UE with triggering conditions of one or more beam failure events, so that when the triggering conditions are satisfied, the UE reports beam failure events.

In this embodiment, the triggering conditions are one or more of the following that:

all beams used by all DCI contained in any control resource set fail in transmission;

all beams used by all DCI contained in all control resource sets fail in transmission; and all beams used by all DCI contained in a predefined control resource set fail in transmission.

With the apparatus of this embodiment, in addition to the configuration of the CORESET, the network device further configures, for the user equipment, triggering conditions used for triggering the user equipment to report beam failure events, and when the user equipment detects that the triggering conditions are satisfied, the UE reports the beam failure events, thus another solution for triggering report of beam failure events is provided for a scenario where one piece of DCI is transmitted in multiple CORESETs or a scenario where one or more CORESETs transmit multiple pieces of DCI.

Embodiment 6

The embodiment of this disclosure provides an apparatus for triggering a beam failure event. As principles of the apparatus for solving problems are similar to that of the method in Embodiment 3, reference may be made to the implementation of the method in Embodiment 3 for implementation of the apparatus, with identical contents being not going to be described herein any further.

Figure 9:
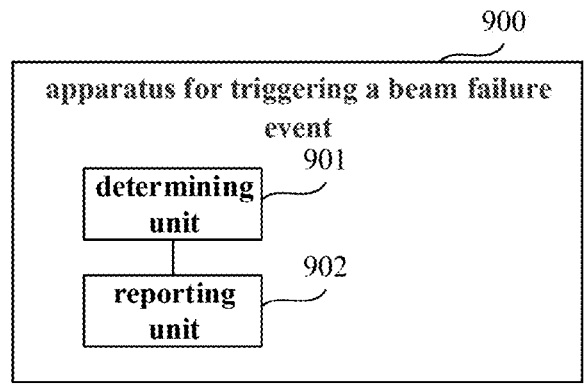
FIG. 9 is a schematic diagram of the apparatus for triggering a beam failure event of Embodiment 6.

FIG. 9 is a schematic diagram of the apparatus for triggering a beam failure event of this embodiment. As shown in FIG. 9, the apparatus 900 includes: a determining unit 901 and a reporting unit 902. The determining unit 901 is configured to determine whether a trigger condition of a beam failure event is satisfied according to configuration of a network device, and the reporting unit 902 is configured to report a beam failure event when the trigger condition of a beam failure event is satisfied.

In one implementation, the configuration of a network device is: one or more control channel monitoring groups, each monitoring group corresponding to one or more pieces of DCI, and that when the UE detects that all beams to which a monitoring group corresponds fail in transmission, the UE reports beam failure event of the monitoring group fails in transmission.

In another implementation, the configuration of a network device is: triggering conditions of one or more beam failure events, and when the UE detects that the triggering conditions are satisfied, the UE reports beam failure events.

With the method of this embodiment, in addition to the configuration of the CORESET, the network device further configures, for the user equipment, a control channel monitoring group for triggering the user equipment to report beam failure event, or configures, for the user equipment, the triggering conditions for triggering the user equipment to report beam failure events, and when the user equipment detects that all the beams to which a monitoring group corresponds fail in transmission or monitors that the triggering conditions are satisfied, the user equipment reports the beam failure event(s), which solves a problem of monitoring and reporting of beam failure in a scenario where one piece of DCI is transmitted in multiple CORESETs or one CORESET transmits multiple pieces of DCI, accuracy of the detection is higher, and no more resources will be consumed.

Embodiment 7

The embodiment of this disclosure provides a network device, including the apparatus described in Embodiment 4 or Embodiment 5.

Figure 10:
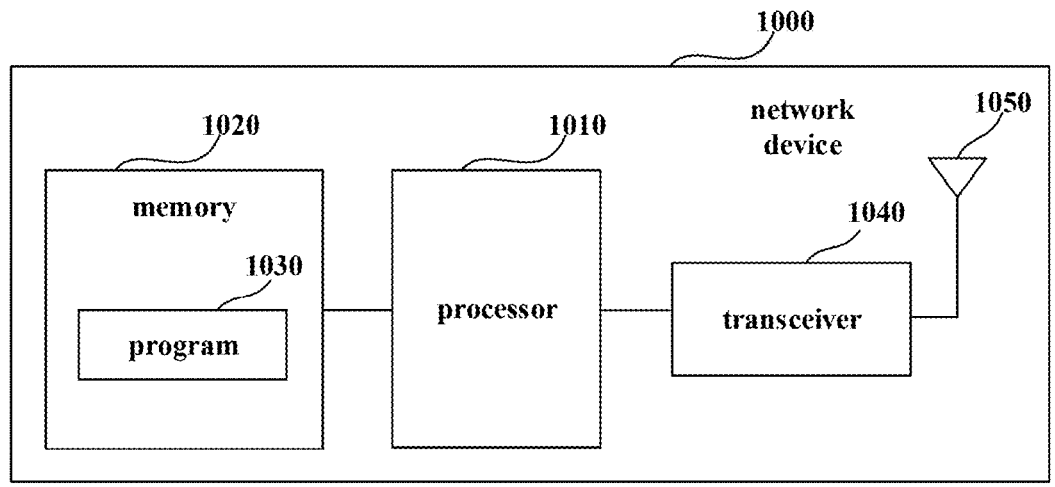
FIG. 10 is a schematic diagram of the network device of Embodiment 7.

FIG. 10 is a schematic diagram of a structure of the network device of this embodiment. As shown in FIG. 10, the network device 1000 may include a processor 1010 and a memory 1020, the memory 1020 being coupled to the processor 1010. The memory 1020 may store various data, and furthermore, it may store a program 1030 for information processing, and execute the program 1030 under control of the processor 1010, so as to receive various information transmitted by a terminal equipment, and transmit various information to the terminal equipment.

In one implementation, the functions of the apparatus in Embodiment 4 or Embodiment 5 may be integrated into processor 1010. For example, the processor 1010 may be configured to: configure UE with one or more control channel monitoring groups, so that when the UE detects that all beams to which a monitoring group corresponds fail in transmission, the UE reports beam failure event of the monitoring group fail in transmission; wherein, each monitoring group corresponds to one or more pieces of DCI. For another example, the processor 1010 may be configured to: configure UE with triggering conditions of one or more beam failure events, so that when the triggering conditions are satisfied, the UE reports beam failure events.

In another implementation, the apparatus in Embodiment 4 or Embodiment 5 and the processor 1010 may be configured separately. For example, the apparatus in Embodiment 4 or Embodiment 5 may be configured as a chip connected to the processor 1010, with the functions of the apparatus in Embodiment 4 or Embodiment 5 being carried out under control of the processor 1010.

Furthermore, as shown in FIG. 10, the network device 1000 may include a transceiver 1040, and an antenna 1050, etc. Functions of the above components are similar to those in the related art, and shall not be described herein any further. It should be noted that the network device 1000 does not necessarily include all the parts shown in FIG. 10, and furthermore, the network device 1000 may include parts not shown in FIG. 10, and the related art may be referred to.

With the network device of this embodiment, in addition to the configuration of the CORESET, the network device further configures, for the user equipment, a control channel monitoring group for triggering the user equipment to report a beam failure event, or configures, for the user equipment, the triggering conditions for triggering the user equipment to report beam failure events, and when the user equipment detects that all the beams to which a monitoring group corresponds fail in transmission or detects that the triggering conditions are satisfied, the user equipment reports the beam failure event(s), which solves a problem of monitoring and reporting of beam failure in a scenario where one piece of DCI is transmitted in multiple CORESETs or one CORE- SET transmits multiple pieces of DCI, accuracy of the detection is higher, and no more resources will be consumed.

Embodiment 8

The embodiment of this disclosure provides a terminal equipment, including the apparatus for triggering a beam failure event described in Embodiment 6.

Figure 11:
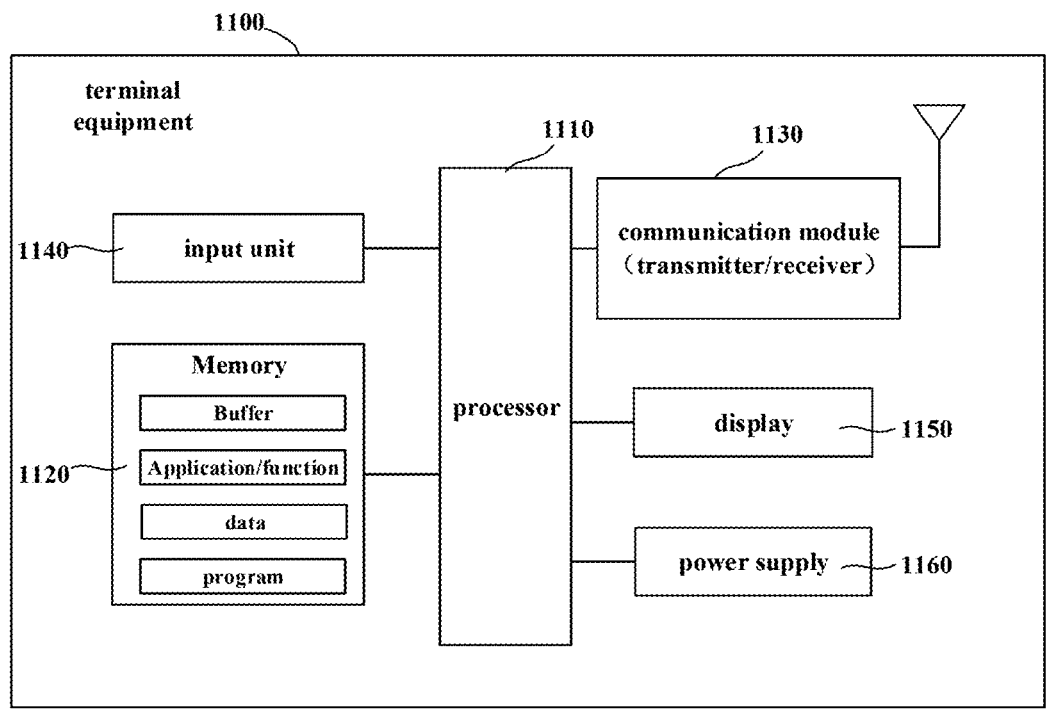
FIG. 11 is a schematic diagram of the terminal equipment of Embodiment 8.

FIG. 11 is a schematic diagram of a systematic structure of the terminal equipment 1100 of the embodiment of this disclosure. As shown in FIG. 11, the terminal equipment 1100 may include a processor 1110 and a memory 1120, the memory 1120 being coupled to the processing unit 1110. It should be noted that his figure is illustrative only, and other types of structures may also be used, so as to supplement or replace this structure and achieve a telecommunications function or other functions.

In one implementation, the functions of the apparatus for triggering a beam failure event in Embodiment 6 may be integrated into processor 1110. For example, the processor 1110 may be configured to: determine whether a trigger condition of a beam failure event is satisfied according to configuration of a network device; and report a beam failure event when the trigger condition of a beam failure event is satisfied.

In another implementation, the apparatus for triggering a beam failure event in Embodiment 6 and the processor 1110 may be configured separately. For example, the apparatus for triggering a beam failure event in Embodiment 6 may be configured as a chip connected to the processor 1110, with the functions of the apparatus for triggering a beam failure event in Embodiment 6 being carried out under control of the processor 1110.

As shown in FIG. 11, the terminal equipment 1100 may further include a communication module 1130, an input unit 1140, a display 1150, and a power supply 1160, etc. It should be noted that the terminal equipment 1100 does not necessarily include all the parts shown in FIG. 11, and furthermore, the terminal equipment 1100 may include parts not shown in FIG. 11, and the related art may be referred to.

As shown in FIG. 11, the processor 1110 is sometimes referred to as a controller or control, which may include a microprocessor or other processor devices and/or logic devices, and the processor 1110 receives input and controls operations of every component of the terminal equipment 1100.

The memory 1120 may be, for example, one or more of a buffer memory, a flash memory, a hard drive, a mobile medium, a volatile memory, a nonvolatile memory, or other suitable devices, which may store the information on configuration, etc., and furthermore, store programs executing related information. And the processor 1110 may execute programs stored in the memory 1120, so as to realize information storage or processing, etc. Functions of other parts are similar to those of the related art, which shall not be described herein any further. The parts of the terminal equipment 1100 may be realized by specific hardware, firmware, software, or any combination thereof, without departing from the scope of this disclosure.

With the terminal equipment of this embodiment, the beam failure event is reported when it is detected that the beams to which a control channel monitoring group configured by the network device corresponds all fail in transmission or it is detected that the triggering conditions of the beam failure events are satisfied, which solves a problem of monitoring and reporting of beam failure in a scenario where one piece of DCI is transmitted in multiple CORESETs or one CORESET transmits multiple pieces of DCI, accuracy of the detection is higher, and no more resources will be consumed.

Embodiment 9

This embodiment provides a communication system, including the network device as described in Embodiment 7 and the terminal equipment as described in Embodiment 8.

The above apparatuses and methods of this disclosure may be implemented by hardware, or by hardware in combination with software. The present disclosure relates to such a computer-readable program that when the program is executed by a logic device, the logic device is enabled to carry out the apparatus or components as described above, or to carry out the methods or steps as described above. The present disclosure also relates to a storage medium for storing the above program, such as a hard disk, a floppy disk, a CD, a DVD, and a flash memory, etc.

The method/apparatus described with reference to the embodiments of this disclosure may be directly embodied as hardware, software modules executed by a processor, or a combination thereof. For example, one or more functional block diagrams and/or one or more combinations of the functional block diagrams shown in FIG. 7 may either correspond to software modules of procedures of a computer program, or correspond to hardware modules. Such software modules may respectively correspond to the steps shown in FIG. 2. And the hardware module, for example, may be carried out by firming the soft modules by using a field programmable gate array (FPGA).

The soft modules may be located in an RAM, a flash memory, an ROM, an EPROM, and EEPROM, a register, a hard disc, a floppy disc, a CD-ROM, or any memory medium in other forms known in the art. A memory medium may be coupled to a processor, so that the processor may be able to read information from the memory medium, and write information into the memory medium; or the memory medium may be a component of the processor. The processor and the memory medium may be located in an ASIC. The soft modules may be stored in a memory of a mobile terminal, and may also be stored in a memory card of a pluggable mobile terminal. For example, if equipment (such as a mobile terminal) employs an MEGA-SIM card of a relatively large capacity or a flash memory device of a large capacity, the soft modules may be stored in the MEGA-SIM card or the flash memory device of a large capacity.

One or more functional blocks and/or one or more combinations of the functional blocks in figures may be realized as a universal processor, a digital signal processor (DSP), an application-specific integrated circuit (ASIC), a field programmable gate array (FPGA) or other programmable logic devices, discrete gate or transistor logic devices, discrete hardware component or any appropriate combinations thereof carrying out the functions described in this application. And the one or more functional block diagrams and/or one or more combinations of the functional block diagrams in the drawings may also be realized as a combination of computing equipment, such as a combination of a DSP and a microprocessor, multiple processors, one or more microprocessors in communication combination with a DSP, or any other such configuration.

This disclosure is described above with reference to particular embodiments. However, it should be understood by those skilled in the art that such a description is illustrative only, and not intended to limit the protection scope of the present disclosure. Various variants and modifications may be made by those skilled in the art according to the principles of the present disclosure, and such variants and modifications fall within the scope of the present disclosure.

What is claimed is:

1. An apparatus for configuring a monitoring group, the apparatus comprising:
   a memory that stores a plurality of instructions; and
   processor circuitry that couples to the memory and is configured to execute the plurality of instructions to:
   configure UE with one or more control channel monitoring groups, so that when the UE detects that all beams to which a monitoring group corresponds fail in transmission, the UE reports beam failure event of the monitoring group fails in transmission;
   wherein, each monitoring group corresponds to one or more pieces of downlink control information (DCI).

2. The apparatus according to claim 1, wherein each monitoring group comprises IDs of all quasi-co-locations to which one or more pieces of DCI correspond, configuration of the IDs of the quasi-co-locations of the multiple pieces of DCI being identical.

3. The apparatus according to claim 1, wherein each monitoring group comprises an ID of a physical resource to which one piece of DCI corresponds.

4. The apparatus according to claim 3, wherein the ID of the physical resource comprises at least one of the followings: an ID of a control resource set, an ID of a search space, and an ID of a set of control channel candidates.

5. The apparatus according to claim 1, wherein one piece of DCI corresponds to one DCI format, or one piece of DCI corresponds to a control channel candidate, or one piece of DCI corresponds to a set of control channel candidates.

6. An apparatus for configuring a triggering condition of a beam failure event, the apparatus comprising:
   a memory that stores a plurality of instructions; and
   processor circuitry that couples to the memory and is configured to execute the plurality of instructions to:
   configure UE with triggering conditions of one or more beam failure events, so that when the triggering conditions are satisfied, the UE reports beam failure events,
   wherein the triggering conditions are one or more of the following that:
   all beams used by all DCI contained in any control resource set fail in transmission;
   all beams used by all DCI contained in all control resource set fail in transmission; and
   all beams used by all DCI contained in a predefined control resource set fail in transmission.

7. An apparatus for triggering a beam failure event, applicable to UE, the apparatus comprising:
   a memory that stores a plurality of instructions; and
   processor circuitry that couples to the memory and is configured to execute the plurality of instructions to:
   determine whether a trigger condition of a beam failure event is satisfied according to configuration of a network device; and
   report a beam failure event when the trigger condition of a beam failure event is satisfied,
   wherein the configuration of a network device is: one or more control channel monitoring groups, each monitoring group corresponding to one or more pieces of DCI, and when the UE detects that all beams to which a monitoring group corresponds fail in transmission, the processor circuitry is further configured to report beam failure event of the monitoring group fails in transmission.

8. The apparatus according to claim 7, wherein the configuration of a network device is: triggering conditions of one or more beam failure events, and when the UE detects that the triggering conditions are satisfied, the processor circuitry is further configured to report beam failure events.

* * * * *